W. F. GOODWIN.
Harvester Rake.
No. 72,840. Patented Dec. 31, 1867.
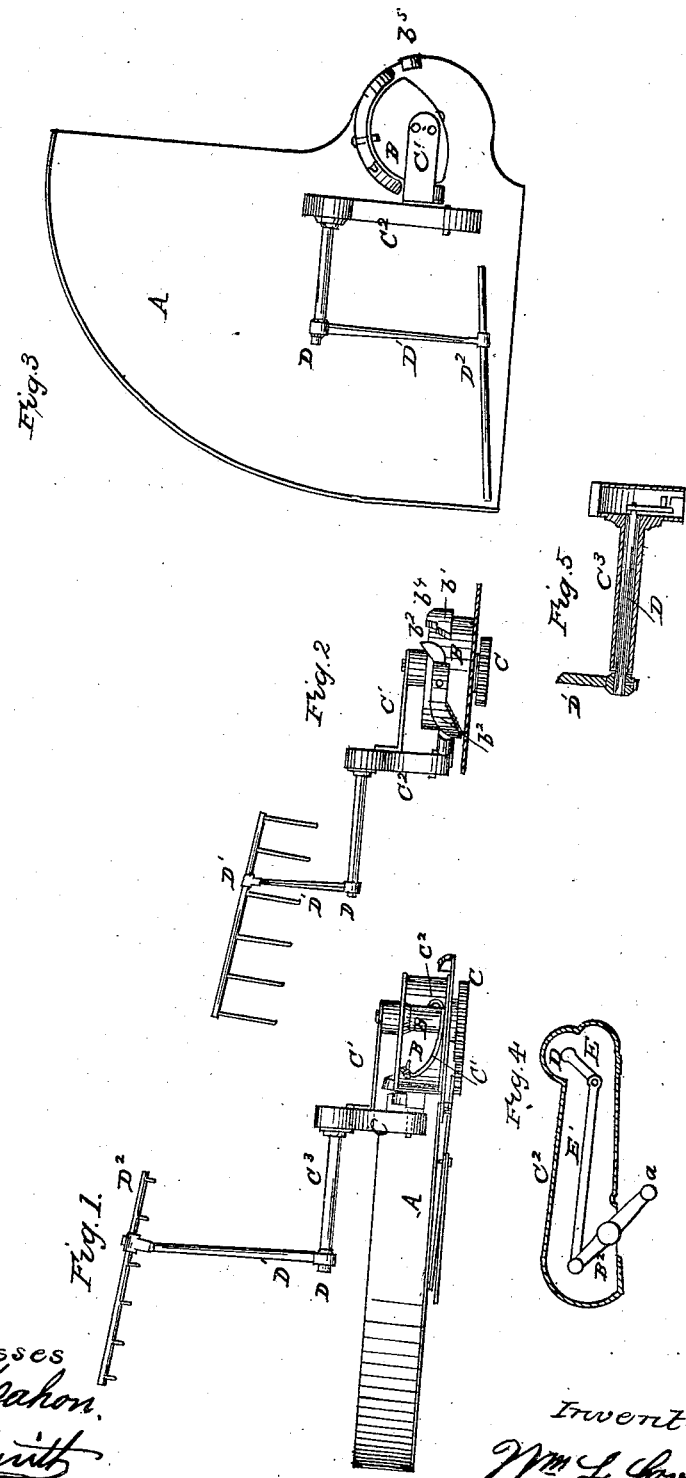

UNITED STATES PATENT OFFICE.

WILLIAM F. GOODWIN, OF EAST NEW YORK, N. Y.

IMPROVEMENT IN HARVESTER-RAKES.

Specification forming part of Letters Patent No. 72,840, dated December 31, 1867.

*To all whom it may concern:*

Be it known that I, WILLIAM F. GOODWIN, of East New York, Kings county, State of New York, have invented a new and useful Improvement in Harvester-Rakes; and I do hereby declare that the following is a full, clear, and exact description thereof, reference being had to the accompanying drawings, in which—

Figure 1 represents a front view of the apparatus, showing the rake in an elevated position, and the means by which the same is attached to the platform. Fig. 2 is a side view of the same, showing the switches and other means by which the rake is elevated and depressed. Fig. 3 is a plan or top view of the platform and raking apparatus, showing the rake in its depressed position. Fig. 4 is an interior view of the rake arm or case, showing parts of the mechanism by which motion is imparted to the rake from the cam-switches; and Fig. 5 is a vertical section through the tubular arm, showing other parts of the rake-operating mechanism.

Similar letters of reference denote corresponding parts in all the figures.

My invention relates to the mechanism for driving the rake and for imparting the necessary rising and falling movements thereto.

To enable others to understand and use my invention, I will proceed to describe the construction and operation of the same.

A represents the platform, made in form substantially as shown in Fig. 3, and having mounted upon it at its inner front corner the box-frame B and tubular standard B', in suitable bearings in which is mounted a vertical shaft, to the lower end of which is connected the spur or driving wheel C, to which a vibratory motion may be communicated from the main driving wheel or wheels of the machine in any desired manner and by any suitable mechanism. The upper end of said shaft is connected to one end of a horizontal arm, C¹, to the opposite or outer end of which is attached what I call the "rake-frame," C², the same consisting of a closed case, made in form substantially as shown at Fig. 4.

C³ is a tubular arm or sleeve constituting a box or bearing attached to the outer or platform side of case c³, in which is mounted the rake-shaft D in such manner as to turn therein.

To the outer end of shaft D the rake-arm D¹ is attached, and is caused to move with said shaft for effecting the necessary rising and falling movements of the rake D in moving back and forth over the platform.

E is a crank-arm connected to the inner end of shaft D, to the outer or swinging end of which is connected the rear end of pitman or connecting-rod E¹, which at its forward end is connected to the upper end of a lever, E², pivoted in suitable bearings in case c³, as shown at e in the drawings. The lower or opposite end of lever E² is armed with a horizontal pin or pivot, on which is mounted a friction-roller, a.

b b¹ is a horizontal ledge or way secured to the outer curved face of the box-frame B, and provided with the spring gates or latches b² b³. These gates or latches are provided with curved faces, the gate or latch b² being curved on its under face and the latch b³ on its upper face, as shown at Fig. 2 of the drawings, and are connected each by a horizontal pivot to the curved face of the box-frame, so as to allow a limited vertical vibration for a purpose hereinafter explained. The standard or box-frame is perforated or slotted to receive and allow the necessary vertical play of pins attached to the inner faces of said latches, one of which pins is shown at c, Fig. 1, and acted upon by springs c¹ c², attached to the tubular standard B', or to the frame B, in any suitable manner, the springs being so arranged as to maintain latch b² in an elevated and latch b³ in a depressed position, as shown at Fig. 2 of the drawings, when not forced out of such position by the action of friction-roller a on the end of vibrating lever E².

The operation is as follows: The rake being supposed to be in position shown in Fig. 3, resting upon the front of the platform and ready to begin its effective stroke, and motion being imparted to the vertical shaft through wheel C or its equivalent, the arm C¹ is moved in the arc of a circle of which said shaft is the center, carrying with it the rake frame or case C² and rake D², through the connections above described, to the point of discharge. In this movement of the rake the roller a, passing underneath the ledge or way b, rises and passes underneath the spring-latch b³, which, as soon as the roller has passed by, returns to its former position, when the rake, having effected the discharge of the gavel, commences its return stroke, and the roller $a$, coming in contact with the curved or inclined face of the switch $b^3$, is forced upward, carrying with it the end of the vibrating lever to which it is attached, and thereby, through connecting-rod $E^1$, operating crank E and shaft D, the rake is elevated for passing over the grain on the platform, in position shown by the drawings. In such return or forward movement the roller passes over the ledge or way $b$ and over the latch $b^2$, depressing the same until it reaches stop $b^4$, when, having passed the latch, the latter resumes its elevated position and allows the roller to descend through the opening in the ledge or track formed thereby, thus allowing the rake to descend upon the platform for the purpose of again sweeping the grain therefrom. $b^5$ is a stop for limiting the backward or effective stroke of the rake.

Having now described my invention, what I claim as new is—

1. The vibrating rake frame or case $C^2$, provided with the tubular arm $C^3$, arranged and operating in combination with the vertical shaft, substantially as described.

2. The rake-shaft D, provided with the crank-arm E, in combination with the tubular arm $C^3$ and the rake-frame $C^2$, substantially as described.

3. The horizontal track or way $b$, provided with the cam-switches $b^2$ $b^3$, in combination with the reciprocating and vibrating lever $E^2$, connecting-rod $E^1$, and crank-arm E for giving the rising and falling movements to the rake, as described.

WM. F. GOODWIN

Witnesses:
   ALEX. MAHON,
   MOSES FOSTER.